United States Patent
Wu et al.

(10) Patent No.: US 11,762,460 B2
(45) Date of Patent: Sep. 19, 2023

(54) METHOD FOR DYNAMICALLY ADJUSTING USER INTERFACE, ELECTRONIC DEVICE AND COMPUTER-READABLE STORAGE MEDIUM

(71) Applicant: HTC Corporation, Taoyuan (TW)

(72) Inventors: Jing-Lung Wu, Taoyuan (TW); Ya-Chih Hsiao, Taoyuan (TW); Ching-Yang Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/408,513

(22) Filed: Aug. 23, 2021

(65) Prior Publication Data
US 2022/0091666 A1   Mar. 24, 2022

(30) Foreign Application Priority Data
Sep. 24, 2020 (TW) .................. 109133003

(51) Int. Cl.
*G06F 3/01* (2006.01)
*G06T 3/20* (2006.01)

(52) U.S. Cl.
CPC ............ *G06F 3/013* (2013.01); *G06T 3/20* (2013.01)

(58) Field of Classification Search
CPC .......... G06F 3/013; G06F 3/012; G06F 3/011; G06T 3/20
See application file for complete search history.

(56) References Cited

U.S. PATENT DOCUMENTS

| | | | | |
|---|---|---|---|---|
| 5,724,285 A | * | 3/1998 | Shinohara | G06F 11/2015 365/228 |
| 5,977,935 A | * | 11/1999 | Yasukawa | G06F 1/1616 348/E5.145 |
| 6,292,158 B1 | * | 9/2001 | Amafuji | G06F 1/163 345/9 |
| 10,001,645 B2 | * | 6/2018 | Norden | G02B 27/01 |
| 2007/0296646 A1 | * | 12/2007 | Yamamoto | G02B 27/017 345/8 |
| 2011/0148933 A1 | * | 6/2011 | Murakami | H04L 67/75 345/660 |
| 2011/0285704 A1 | * | 11/2011 | Takeda | H04N 21/4854 345/419 |
| 2015/0009132 A1 | * | 1/2015 | Kuriya | G02B 27/0093 345/156 |
| 2021/0103336 A1 | * | 4/2021 | Li | G06F 1/163 |

FOREIGN PATENT DOCUMENTS

CN   107211195   9/2017

OTHER PUBLICATIONS

"Office Action of Taiwan Counterpart Application", dated Jun. 30, 2021, p. 1-p. 6.

* cited by examiner

*Primary Examiner* — Mihir K Rayan
(74) *Attorney, Agent, or Firm* — JCIPRNET

(57) ABSTRACT

The invention provides a method for dynamically adjusting user interface, an electronic device and a computer-readable storage medium. The method includes: displaying a user interface, wherein the user interface partially displays a first block, and the first block includes at least one layer; monitoring a first moving direction of a first specific object; in response to determining that the first specific object moves toward the first block, moving at least one of the at least one layer in the first block toward a reference point in the user interface.

18 Claims, 5 Drawing Sheets

METHOD FOR DYNAMICALLY ADJUSTING USER INTERFACE, ELECTRONIC DEVICE AND COMPUTER-READABLE STORAGE MEDIUM

CROSS-REFERENCE TO RELATED APPLICATION

This application claims the priority benefit of Taiwan application no. 109133003, filed on Sep. 24, 2020. The entirety of the above-mentioned patent application is hereby incorporated by reference herein and made a part of this specification.

TECHNICAL FIELD

The invention relates to a display interface adjustment technology, and more particularly, to a method for dynamically adjusting user interface, an electronic device and a computer-readable storage medium.

BACKGROUND

In the user interface presented by the conventional head up display (HUD), there are usually many objects/blocks that can provide additional information to a user. However, when the objects/blocks are more or larger, they may block or disturb a field of view in front of the user, resulting in a poor user experience.

In addition, for ordinary people, the eyes are weak in recognizing text located on an outer side or a border of the field of view. Therefore, when the text provided by the HUD is located near the border of the field of view of the user, the text may be difficult for the user to recognize.

SUMMARY

Accordingly, the invention provides a method for dynamically adjusting a user interface, an electronic device and a computer-readable medium, which can be used to solve the technical problem described above.

The invention provides a method for dynamically adjusting user interface, which includes: displaying a user interface, wherein the user interface partially displays a first block, and the first block includes at least one layer; monitoring a first moving direction of a first specific object; in response to determining that the first specific object moves toward the first block, moving at least one of the at least one layer in the first block toward a reference point in the user interface.

The invention provides an electronic device, which includes a display, a storage circuit and a processor. The storage unit stores a plurality of modules. The processor is coupled to display and the storage circuit, and accesses the modules to perform steps of: controlling the display to display a user interface, wherein the user interface partially displays a first block, and the first block includes at least one layer; monitoring a first moving direction of a first specific object; in response to determining that the first specific object moves toward the first block, moving at least one of the at least one layer in the first block toward a reference point in the user interface.

The invention provides a computer-readable medium. The computer-readable medium records an executable computer program, and the executable computer program is loaded by an electronic device to perform steps of: displaying a user interface, wherein the user interface partially displays a first block, and the first block includes at least one layer; monitoring a first moving direction of a first specific object; in response to determining that the first specific object moves toward the first block, moving at least one of the at least one layer in the first block toward a reference point in the user interface.

DETAILED DESCRIPTION

Figure 1:
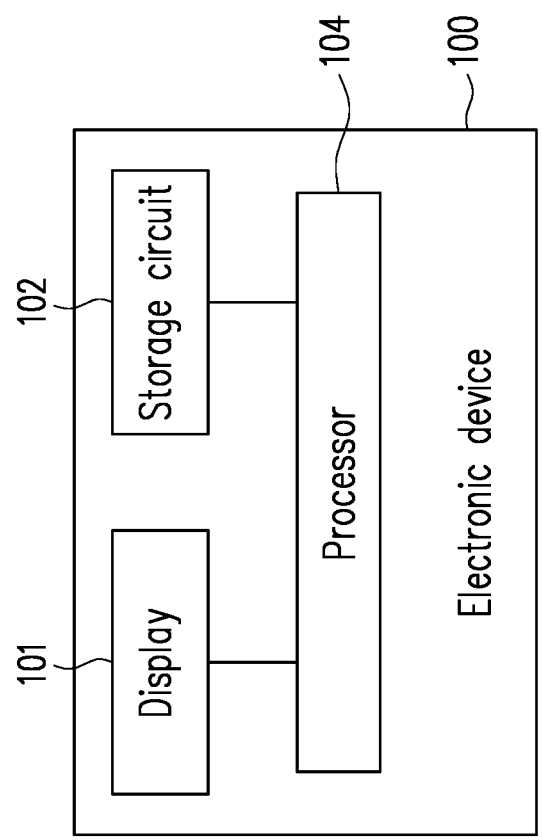
FIG. 1 is a schematic diagram of an electronic device illustrated according an embodiment of the invention.

Referring to FIG. 1, FIG. 1 is a schematic diagram of an electronic device illustrated according an embodiment of the invention. In different embodiments, an electronic device 100 is, for example, an HUD, or a head-mounted display (HMD) that can be used as the HUD after being worn by a user such as a head-mounted display in a virtual reality (VR) system, but not limited thereto.

As shown by FIG. 1, the electronic device 100 includes a display 101, a storage circuit 102 and a processor 104. The display 101 is, for example, a liquid crystal display (LCD), a thin film transistor (TFT)-LCD, an organic light-emitting diode (OLED), a flexible display, and can be used to display a user interface for a user/a wearer of the electronic device 100 to view.

The storage circuit 102 is, for example, any forms of fixed or movable random access memory (RAM), read only memory (ROM), flash memory, hard disk or other similar devices, or a combination of aforesaid devices, which can be used to record a plurality of program codes or modules.

The processor 104 is coupled to the display 101 and the storage circuit 102, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the embodiment of the invention, the processor 104 can access the modules or the program codes recorded in the storage circuit 102 to realize the method for dynamically adjusting user interface proposed by the invention.

Figure 2:
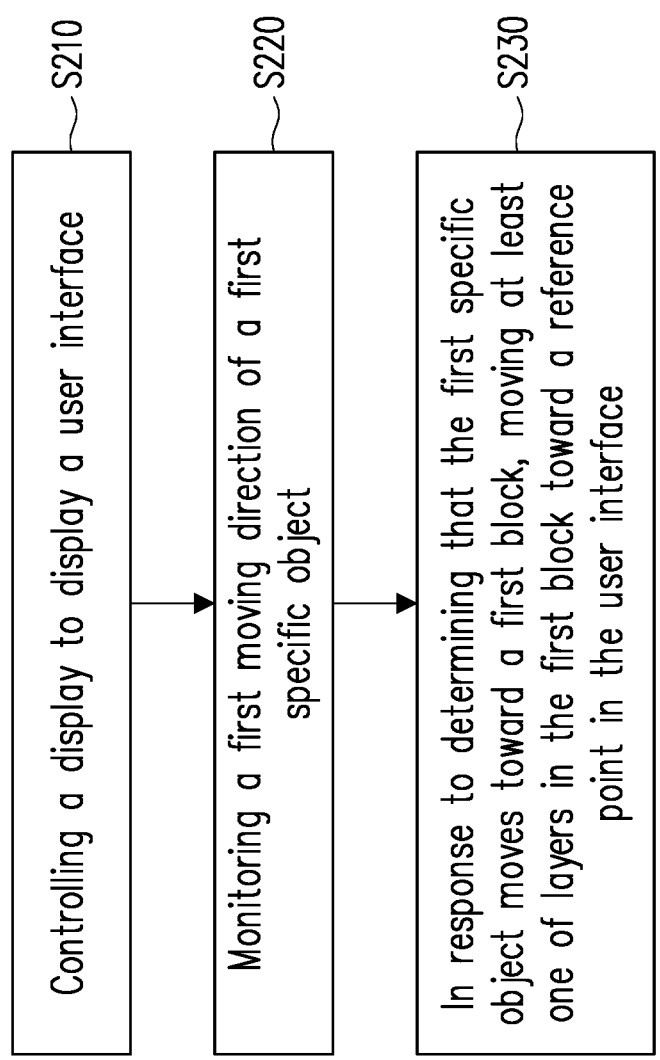
FIG. 2 is a flowchart of a method for dynamically adjusting user interface illustrated according to an embodiment of the invention.

Referring to FIG. 2, FIG. 2 is a flowchart of a method for dynamically adjusting user interface illustrated according to an embodiment of the invention. The method of this embodiment may be executed by the electronic device 100 of FIG. 1, and details of each step of FIG. 2 are described below with reference to each element shown in FIG. 1. Further, in order to make the concept of the disclosure easier to understand, the following description is provided with reference to FIG. 3. Here, FIG. 3 is a schematic diagram illustrating a user interface according to an embodiment of the invention.

First of all, in step S210, the processor 104 can control the display 101 to display a user interface 300. In FIG. 3, the user interface 300 is, for example, an HUD interface, which can partially display blocks 311 to 316. The blocks 311 to 316 are, for example, information blocks including text/image/color for the user, but not limited thereto.

Figure 3:
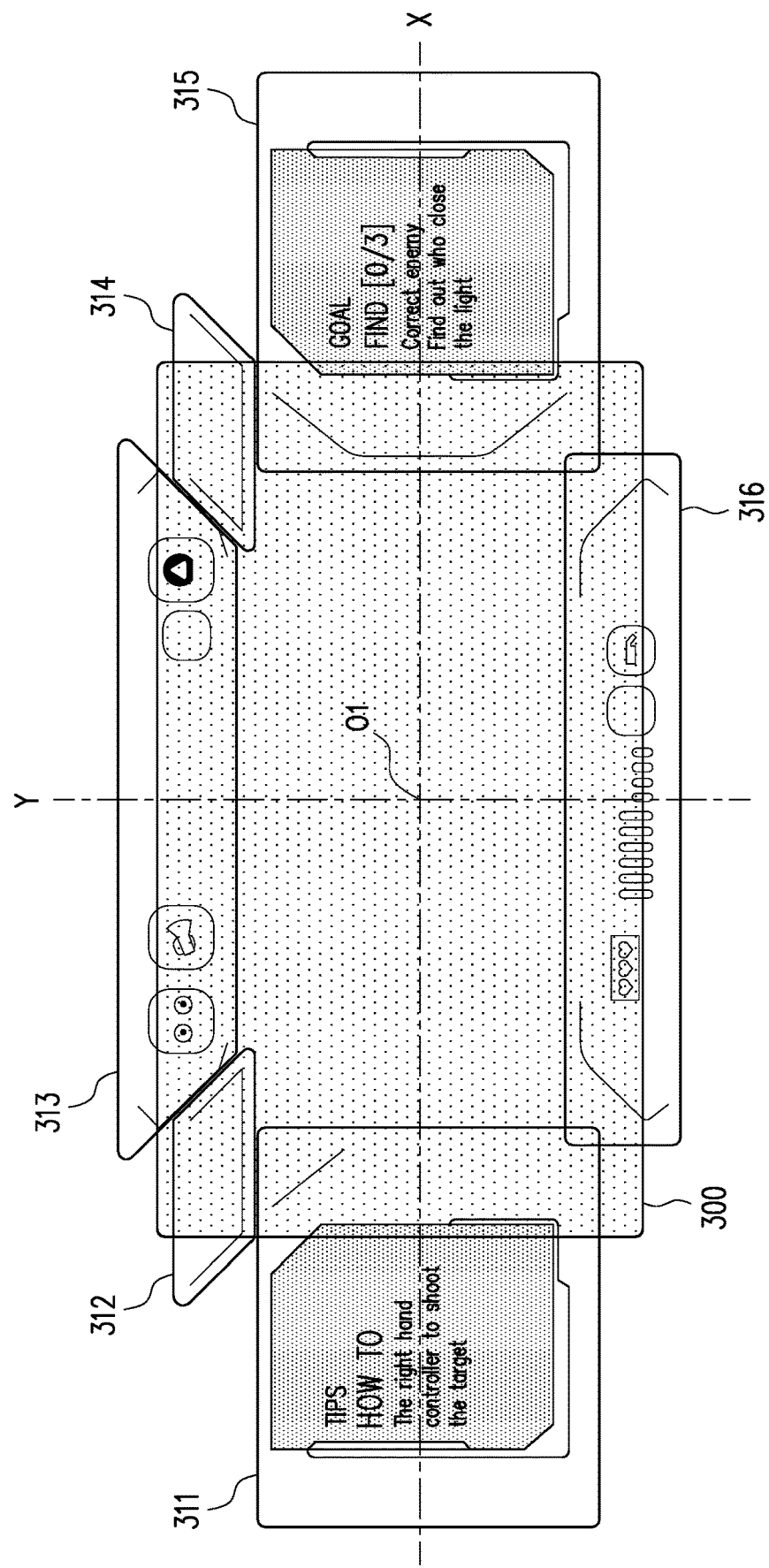
FIG. 3 is a schematic diagram illustrating a user interface according to an embodiment of the invention.

It can be seen from FIG. 3 that each of the blocks 311 to 316 has only a part presented in the user interface 300. In other words, each of the blocks 311 to 316 has another part that is not displayed in the user interface 300. For example, only the right ¼ of the block 311 is presented in the user interface 300, and the left ¾ of the block 311 is not presented in the user interface 300. As another example, only the left ¼ of the block 315 is presented in the user interface 300, and the right ¾ of the block 315 is not presented in the user interface 300. In this case, the field of view of the user can be less blocked or disturbed by the blocks 311 to 316, and a wider view can be obtained.

In this embodiment of the invention, each of the blocks 311 to 316 may include at least one layer, such as an outline layer and a content layer, but not limited thereto. Taking the block 311 as an example, the text part therein may belong to the content layer of the block 311, and the appearance of the remaining block may belong to the outline layer of the block 311, but not limited thereto.

Then, in step S220, the processor 104 can monitor a first moving direction of a first specific object. In the first embodiment, the first specific object may be the head-mounted display, and the first moving direction thereof is, for example, a rotation direction of the head-mounted display (i.e., a rotation direction of the head of the user), but not limited thereto.

Next, in step S230, in response to determining that the first specific object moves toward the first block, at least one layer in the first block is moved toward a reference point in the user interface 300. In this embodiment of the invention, the reference point is, for example, a center point O1 of the user interface 300, but not limited thereto.

In the embodiment of FIG. 3, the first block may be one of the blocks 311 to 316. In other words, when the head-mounted display rotates toward one of the blocks 311 to 316, the processor 104 can correspondingly move at least one layer of that block toward the reference point in the user interface 300 (e.g., the center point O1).

Figure 4:
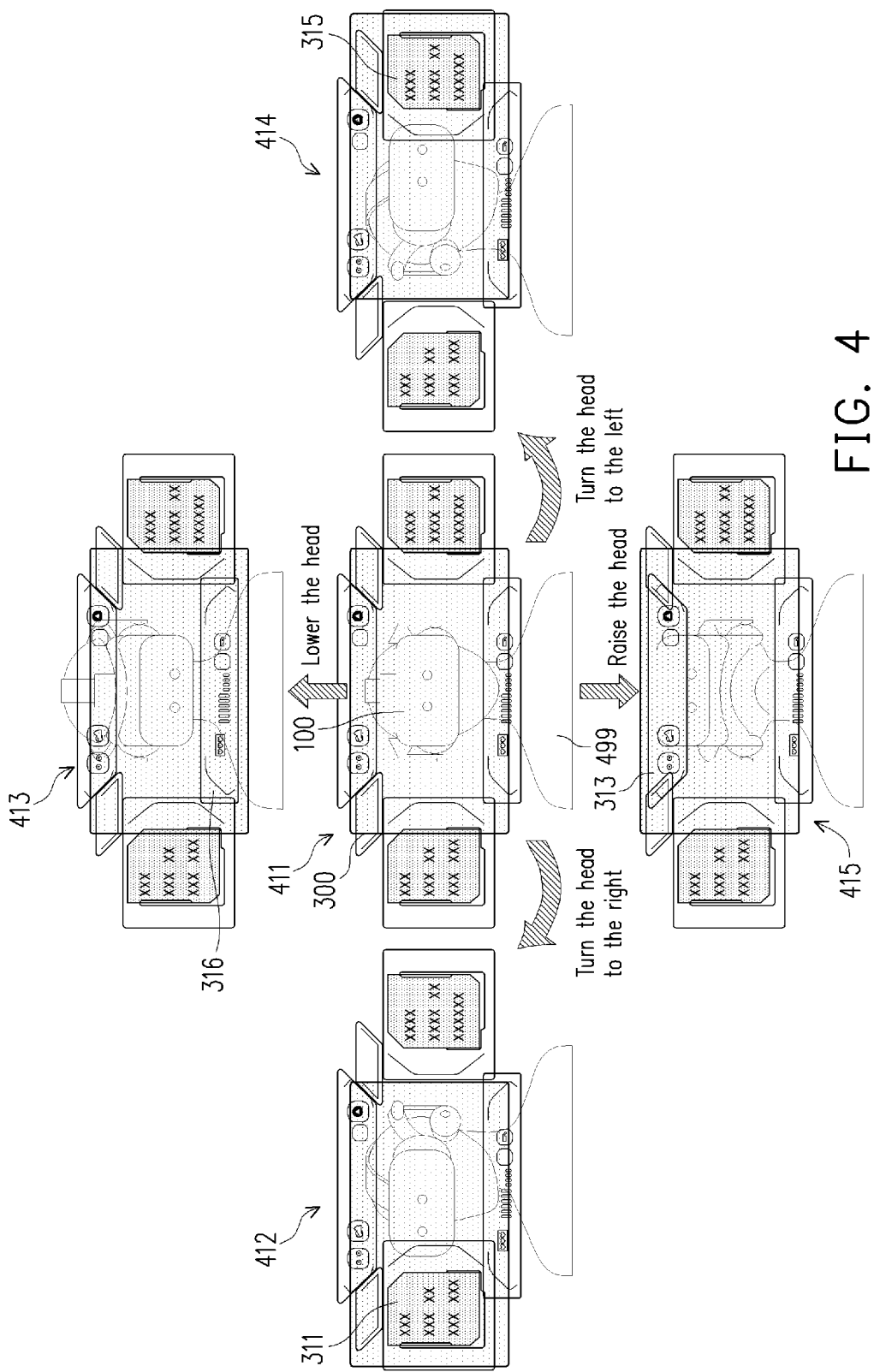
FIG. 4 is a schematic diagram illustrating a moving block according to the embodiment of FIG. 3.

Referring to FIG. 4, FIG. 4 is a schematic diagram illustrating the moving block according to the embodiment of FIG. 3. In FIG. 4, it is assumed that the electronic device 100 is a head-mounted display worn by a user 499. Under this assumption, a state 411 is, for example, a situation where the user 499 does not rotate the head and looks directly in front of the face, and positions of the blocks 311 to 316 may be the same as the configuration in FIG. 3, for example. In addition, states 412 to 415 are, for example, situations in which the user 499 turns the head to the right, lowers the head, turns the head to the left, and raises the head while still looking directly in front of the face, but not limited thereto.

As shown in FIG. 4, when the user changes from the state 411 to the state 412, the processor 104 can correspondingly determine that the electronic device 100 (i.e., the first specific object) moves in a direction toward the block 311, correspondingly regard the block 311 as the first block, and synchronously move each layer (e.g., the outline layer and the content layer) of the block 311 toward the center point O1 of the user interface 300. In an embodiment, the processor 104 can continuously move the block 311 toward the center point O1 until the block 311 can be completely presented in the user interface 300, but not limited thereto. Therefore, when rotating the head to the right, the user 499 can correspondingly observe that the block 311 is moved toward the center point O1, and then view the complete content of the block 311.

Also, in an embodiment, when the user rotates the head to move away from the block 311 (e.g., changes from the state 412 to the state 411), the processor 104 can correspondingly determine that the electronic device 100 moves in a direction away from the first block, and correspondingly restore the block 311 to the original position as shown in FIG. 3. In this way, the block 311 can be partially displayed in the user interface 300 again, but not limited thereto.

In addition, when the user changes from the state 411 to the state 413, the processor 104 can correspondingly determine that the electronic device 100 (i.e., the first specific object) moves in a direction toward the block 316, correspondingly regard the block 316 as the first block, and synchronously move each layer of the block 316 toward the center point O1 of the user interface 300. Therefore, when lowering the head, the user 499 can correspondingly observe that the block 316 is moved toward the center point O1 and then view the complete content of the block 316.

When the user changes from the state 411 to the state 414, the processor 104 can correspondingly determine that the electronic device 100 (i.e., the first specific object) moves in a direction toward the block 315, correspondingly regard the block 315 as the first block, and synchronously move each layer of the block 315 toward the center point O1 of the user interface 300. Therefore, when rotating the head to the left, the user 499 can correspondingly observe that the block 315 is moved toward the center point O1, and then view the complete content of the block 315.

Similarly, when the user changes from the state 411 to the state 415, the processor 104 can correspondingly determine that the electronic device 100 (i.e., the first specific object) moves in a direction toward the block 313, correspondingly regard the block 313 as the first block, and synchronously move each layer of the block 313 toward the center point O1 of the user interface 300. Therefore, when raising the head, the user 499 can correspondingly observe that the block 313 is moved toward the center point O1, and then view the complete content of the block 313.

It can be seen from the above that when the user 499 does not rotate the head and looks straight ahead (i.e., in the state 411), the method of the invention can allow the user 499 to have a wider view by making the user interface 300 display only a part of each of the blocks 311 to 316. Moreover, when it is detected that the head of the user 499 moves toward one particular block, the method of the invention can correspondingly move that block toward the reference point of the user interface 300 (e.g., the center point O1), thereby allowing the user 499 to view the complete content of that block.

In addition, in the second embodiment, the first specific object may also be an eye of the user 499 of the electronic device 100, and the first moving direction thereof is, for example, a rotation direction of the eye. Since a gaze point of the user 499 in the user interface 300 will move with the rotation of the eye, the first moving direction can be understood to be the same as a moving direction of the gaze point of the user 499, but not limited thereto.

In this case, when the eye of the user 499 rotates toward one of the blocks 311 to 316 (e.g., the gaze point moves toward that block), the processor 104 can accordingly determine that the first specific object moves in a direction toward that block, and then move at least one layer of that block toward the reference point in the user interface 300.

For example, when the user 499 in the state 411 rotates the eye to the right (e.g., the gaze point moves to the right), the processor 104 can correspondingly determine that the first specific object moves in the direction toward the block 311, and move each layer of the block 311 toward the reference point in the user interface 300.

In other embodiments, since human eyes generally have better recognizing ability for shapes and colors but have weaker recognizing ability for text, when the processor 104 determines that the first specific object moves toward the block 311, the processor 104 may move only the content layer (e.g., including the text) of the block 311 toward the reference point in the user interface 300, or move the content layer toward the reference point in the user interface 300 by a larger amplitude than other layers. In this way, it can help the user 499 to recognize the text content of the block 311, but not limited thereto.

As another example, when the user 499 in the state 411 rotates the eye to the left (i.e., the gaze point moves to the left), the processor 104 can correspondingly determine that the first specific object moves in a direction toward the block 315, and then move each layer of the block 315 toward the reference pint in the user interface 300. However, the invention is not limited in this regard.

In certain situations where the user 499 may move the head/the gaze point arbitrarily, if the processor 104 moves the block in the user interface 399 too sensitively or too frequently based on the movement of the head/the gaze point of the user 499, it may lead to poor user experience.

Accordingly, in the third embodiment, the processor 104 can additionally monitor a second moving direction of a second specific object, and move at least one layer in the first block toward the reference point in the user interface 300 when determining that the second moving direction corresponds to the first moving direction.

In the third embodiment, the first specific object may be one of the head-mounted display and the eye of the user 499, and the second specific object may be the other one of the head-mounted display and the eye of the user 499. In other words, in the third embodiment, the processor 104 moves each layer in the first block toward the reference point in the user interface 300 only when determining that both the head-mounted display and the eye of the user 499 move toward the first block. In addition, when the processor 104 determines that the head-mounted display and the eyes of the user 499 are not both moving toward the first block, the processor 104 may not move the first block. In this way, the processor 104 can avoid moving the first block toward the reference point when the user 499 has no intention to interact with the first block, and accordingly avoid poor experience described above.

In the fourth embodiment, it is assumed that the electronic device 100 is the head-mounted display, and the gaze point of the wearer has a movable range in the user interface displayed on the head-mounted display. In this embodiment, the movable range is, for example, a line of sight range that the gaze point of the wearer can reach after moving, but not limited thereto.

Figure 5:
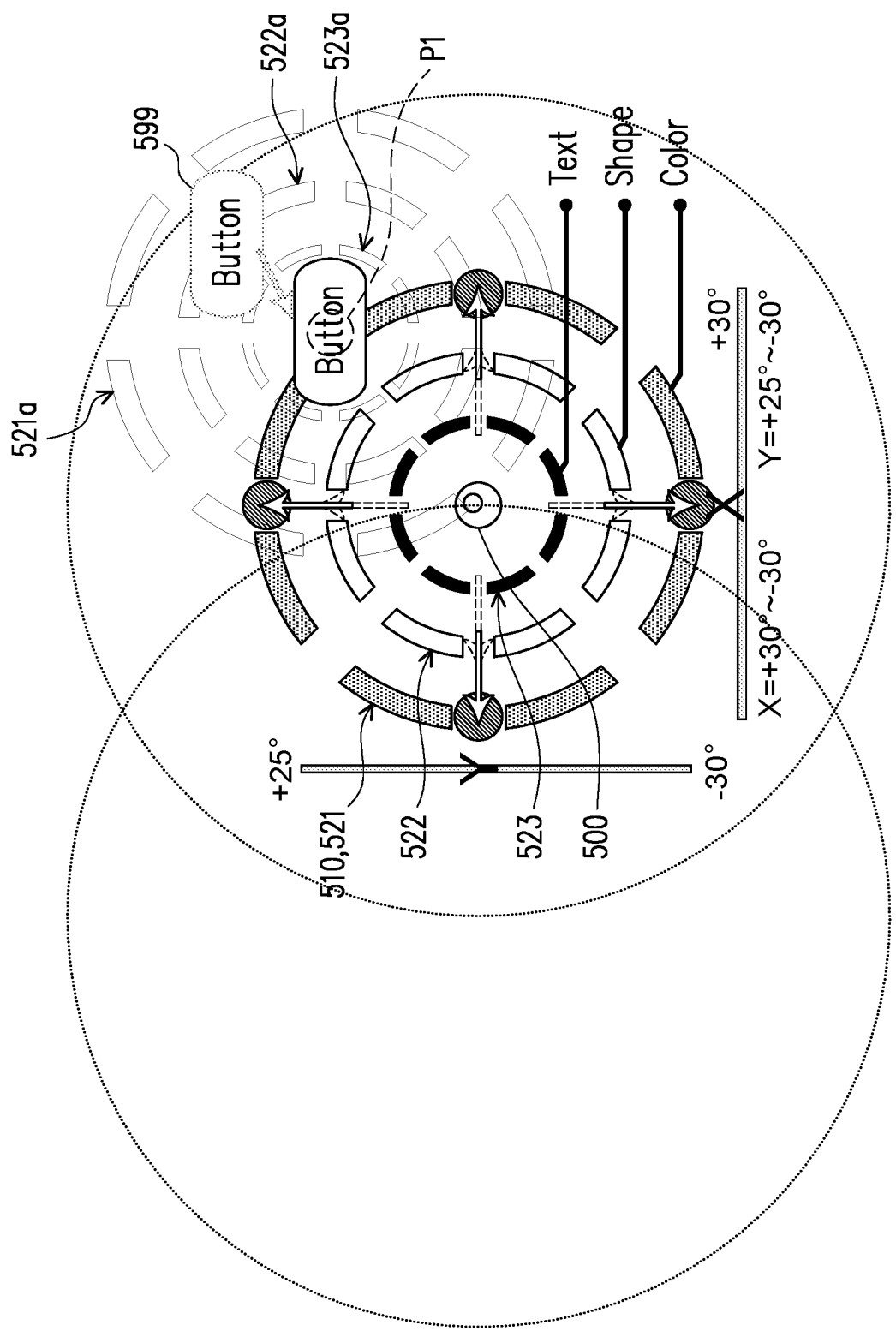
FIG. 5 is a schematic diagram illustrating a movable range of a gaze point according to the fourth embodiment of the invention.

Referring to FIG. 5, FIG. 5 is a schematic diagram illustrating a movable range of a gaze point according to the fourth embodiment of the invention. In this embodiment, it is assumed that a gaze point 500 is the gaze point of the eye of the user 499 in FIG. 4, but not limited thereto.

In general, a horizontal moving range of the gaze point 500 is, for example, +30 degrees to −30 degrees, and the moving rotation range is, for example, +25 degrees to −30 degrees. As can be seen, the gaze point 500 can have a movable range 510 as shown in FIG. 5, which can move in response to the movement of the gaze point 500.

In addition, with a fixed viewing angle, the average human eye can recognize color within 30 to 60 degrees from the viewing angle, shape from 5 to 30 degrees from the viewing angle, and text within 5 to 10 degrees from the viewing angle. Based on this, when the gaze point 500 is located at the position shown in FIG. 5, a range 521 in which color can be recognized by the eye of the user 499 is approximately equal to the movable range 510. In addition, ranges 522 and 523 in which shape and text can be respectively recognized by the eye of the user 499 are as shown in FIG. 5.

In FIG. 5, it is assumed that the gaze point 500 moves to the upper right to a position P1 on a border of the movable range 510, the ranges 521 to 523 will also be moved to the upper right accordingly to form ranges 521a to 523a.

In the fourth embodiment, it is assumed that there is a block 599 outside the movable range 510 in the user interface, which is, for example, a button at the position shown in FIG. 5. According to the previous teaching, since the block 599 is outside the range 523a, even if the gaze point 500 has moved to the border of the movable range 510, the eye of the user 499 cannot clearly recognize the text in the block 599.

Therefore, in the fourth embodiment, after determining that the gaze point 500 moves toward the block 599, the processor 104 can define the gaze point 500 in the movable range 510 as the reference point, and move each layer of the block 599 to the gaze point 500. In FIG. 5, since the gaze point 500 is located at the position P1, the processor 104 can correspondingly move each layer of the block 599 to the position P1 where the gaze point 500 is located. In this case, the user 499 can clearly recognize the text in the block 599, and accordingly obtains better user experience.

In addition, it is assumed that there are other blocks near the block 599 and farther away from the position P1, after determining that the block 599 is closest to the position P1 of the gaze point 500, the processor 104 can move only each layer of the block 599 to the position P1 where the block 599 is located, but not limited thereto.

The invention also provides a computer-readable medium for implementing the method of dynamically adjusting user interface described above. The computer-readable medium is composed of a plurality program commands recorded therein (e.g., setup program commands and deployment program commands). These program commands may be loaded into the electronic device 100 and executed by the electronic device 100 to perform the method of dynamically adjusting user interface and the above-mentioned functions.

In summary, according to the embodiments of the invention, when the user does not rotate the head/the eye, the user interface can partially display each information block, so that the user can have a better view without being disturbed or blocked by the information block. In addition, when determining that the head/the eye of the user move(s) toward the first block, according to the method of the invention, the first block can be correspondingly moved toward the reference point of the user interface, so that the user can view the complete content of the first block.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A method for dynamically adjusting user interface, comprising:
displaying a user interface by an electronic device, wherein the user interface partially displays a first block when the electronic device faces a front direction of a user thereof, and the first block comprises at least one layer, a part of the first block is not displayed in the user interface when the electronic device faces the front direction of the user thereof, wherein the electronic device is a head up display, and the user interface comprises a field of view in front of the user;
monitoring a first moving direction of a first specific object by the electronic device;
in response to determining that the first specific object moves toward the first block partially displayed in the user interface, moving, by the electronic device, at least one of the at least one layer in the first block toward a reference point in the user interface until the first block is completely presented in the user interface, wherein the first specific object is an eye of a user of the head-mounted display, and wherein the first moving direction of the first specific object is characterized as a rotation direction of the eye of the user of the head-mounted display.

2. The method according to claim 1, wherein the first specific object is a head-mounted display for displaying the user interface.

3. The method according to claim 1, wherein the at least one layer of the first block comprises an outline layer and a content layer, and the step of moving the at least one of the at least one layer in the first block toward the reference point in the user interface comprises:
synchronously moving the outline layer and the content layer toward the reference point in the user interface.

4. The method according to claim 1, wherein the at least one layer of the first block comprises an outline layer and a content layer, and the step of moving the at least one of the at least one layer in the first block toward the reference point in the user interface comprises:
moving the content layer toward the reference point in the user interface.

5. The method according to claim 1, wherein a gaze point of the user has a movable range in the user interface, the first block is located outside the movable range, and the step of moving the at least one of the at least one layer in the first block toward the reference point in the user interface comprises:
defining the gaze point of the user in the movable range as the reference point, and moving the at least one layer of the first block to the gaze point.

6. The method according to claim 5, wherein the user interface further comprises a plurality of other blocks, and the gaze point is closest to the first block.

7. The method according to claim 1, wherein the reference point in the user interface is a center point of the user interface.

8. The method according to claim 1, wherein the moved first block is completely presented in the user interface.

9. The method according to claim 1, wherein before the step of moving the at least one of the at least one layer in the first block toward the reference point in the user interface, the method comprises:
monitoring a second moving direction of a second specific object;
moving the at least one of the at least one layer in the first block toward the reference point in the user interface in response to determining that the second moving direction corresponds to the first moving direction, or else not moving the first block.

10. An electronic device, comprising:
a display;
a storage circuit, storing a plurality of modules; and
a processor, coupled to the storage circuit and the display, and accessing the modules to execute steps of:
controlling the display to display a user interface, wherein the user interface partially displays a first block when the electronic device faces a front direction of a user thereof, and the first block comprises at least one layer, a part of the first block is not displayed in the user interface when the electronic device faces the front direction of the user thereof, wherein the electronic device is a head up display, and the user interface comprises a field of view in front of the user;
monitoring a first moving direction of a first specific object;
in response to determining that the first specific object moves toward the first block partially displayed in the user interface, moving at least one of the at least one layer in the first block toward a reference point in the user interface until the first block is completely presented in the user interface, wherein the first specific object is an eye of a user of the head-mounted display, and wherein the first moving direction of the first specific object is characterized as a rotation direction of the eye of the user of the head-mounted display.

11. The electronic device according to claim 10, wherein the first specific object is a head-mounted display for displaying the user interface.

12. The electronic device of claim 10, wherein the at least one layer of the first block comprises an outline layer and a content layer, and the processor is configured for:
synchronously moving the outline layer and the content layer toward the reference point in the user interface.

13. The electronic device of claim 10, wherein the at least one layer of the first block comprises an outline layer and a content layer, and the processor is configured for:
moving the content layer toward the reference point in the user interface.

14. The electronic device of claim 10, wherein a gaze point of the user has a movable range in the user interface, the first block is located outside the movable range, and the processor is configured for:
defining the gaze point of the user in the movable range as the reference point, and moving the at least one layer of the first block to the gaze point.

15. The electronic device of claim 14, wherein the user interface further comprises a plurality of other blocks, and the gaze point is closest to the first block.

16. The electronic device of claim 10, wherein the moved first block is completely presented in the user interface.

17. The electronic device of claim 10, wherein the processor is further configured for:
monitoring a second moving direction of a second specific object;
moving the at least one of the at least one layer in the first block toward the reference point in the user interface in response to determining that the second moving direction corresponds to the first moving direction, or else not moving the first block.

18. A non-transitory computer-readable medium, the computer-readable medium recording an executable computer program, the executable computer program being loaded by an electronic device to perform steps of:

displaying a user interface by the electronic device, wherein the user interface partially displays a first block when the electronic device faces a front direction of a user thereof, and the first block comprises at least one layer, a part of the first block is not displayed in the user interface when the electronic device faces the front direction of the user thereof, wherein the electronic device is a head up display, and the user interface comprises a field of view in front of the user;

monitoring a first moving direction of a first specific object by the electronic device;

in response to determining that the first specific object moves toward the first block partially displayed in the user interface, moving at least one of the at least one layer in the first block toward a reference point in the user interface until the first block is completely presented in the user interface, wherein the first specific object is an eye of a user of the head-mounted display, and wherein the first moving direction of the first specific object is characterized as a rotation direction of the eye of the user of the head-mounted display.

* * * * *